Aug. 30, 1966 J. S. WAPNER 3,269,415

VALVE

Filed April 10, 1964 2 Sheets-Sheet 1

INVENTOR.
JOSEPH S. WAPNER
BY
Busser, Smith & Harding
ATTORNEYS

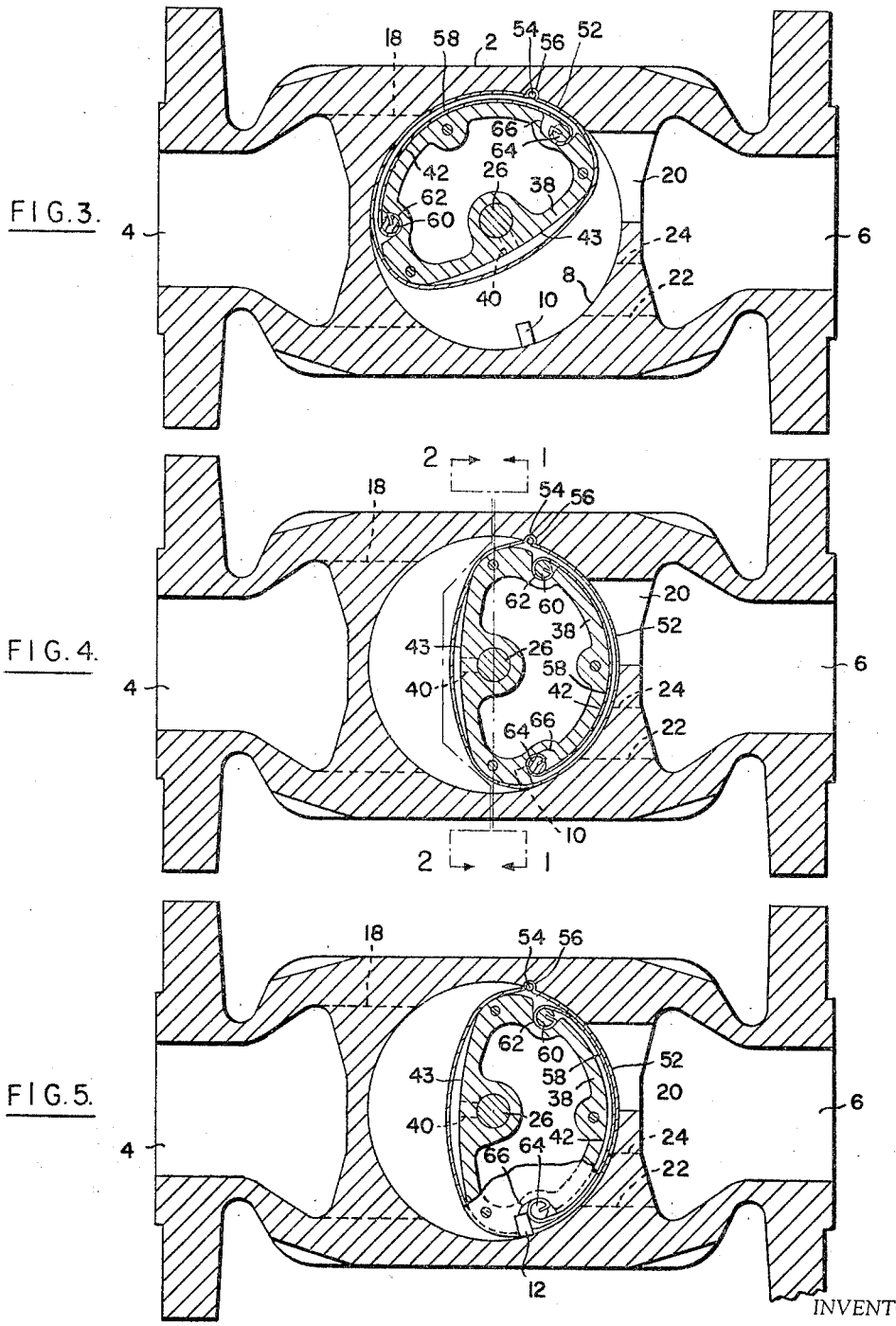

United States Patent Office 3,269,415
Patented August 30, 1966

3,269,415
VALVE
Joseph S. Wapner, Levittown, Pa., assignor to Fischer & Porter Company, Warminster, Pa., a corporation of Pennsylvania
Filed Aug. 10, 1964, Ser. No. 388,471
10 Claims. (Cl. 137—625.28)

This invention relates to valves and has particular reference to valves which will effectively close a passage although the forces required to close and open the valve may be low.

Ordinary valves of conventional types which are effective to provide non-leaking closure under high pressure conditions generally require the exertion of large forces to close them securely and of correspondingly large forces to open them. For this reason reliable conventional valves are not well adapted to servo operation because the motors used must be of high power type. The term "motors" is used herein in a quite general sense to include hydraulic, pneumatic and electromagnetic power devices capable of producing the required valve motion.

In accordance with the present invention, a closure element of flexible nature is provided having a gradual closing action such as is desirable to provide modulation of flow. When a position is reached at which tight closure is to occur an arrangement is provided forcing the closure element to a tightly seated position in which, desirably, the pressure of the fluid being controlled acts in a fashion to augment the tightness of the closure. When the valve is to be opened a peeling action occurs which, particularly following a release of pressure, makes easy the opening of the valve. While inherently the construction is such that frictional forces are minimized, the construction desirably involves utilization of the low friction characteristics of tetrafluoroethylene (Teflon).

The general objects of the invention are concerned with the attainment of the desirable ends briefly described.

These and other objects of the invention particularly relating to details of construction and operation will become apparent from the following description, read in conjunction with the accompanying drawings, in which:

FIGURES 3, 4 and 5 are transverse sections taken on the surface indicated at 3—3 in FIGURE 2 showing the valve in successive steps of adjustment, FIGURE 3 showing the valve open, FIGURE 4 showing it substantially closed but prior to tightening, and FIGURE 5 showing it in fully closed and tightened condition.

Figure 2:
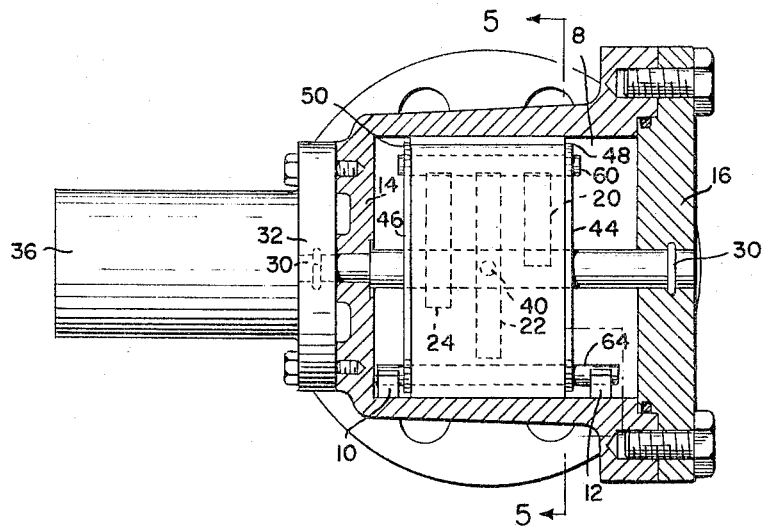
FIGURE 2 is a similar axial section but looking in the reverse direction, the section being taken on the plane indicated at 2—2 in FIGURE 4.
Figure 1:
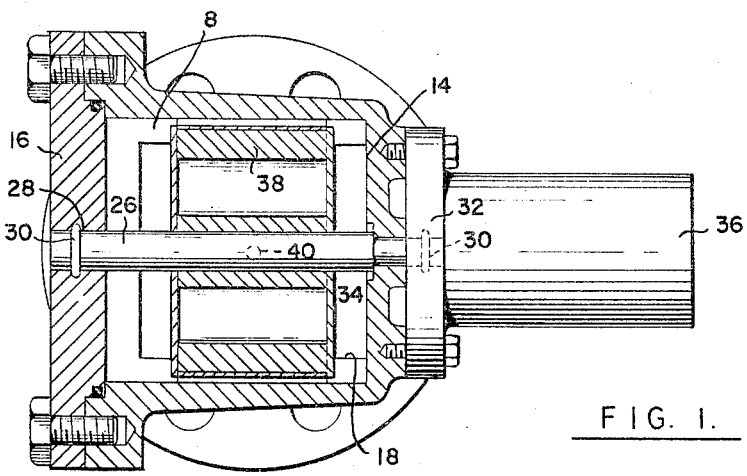
FIGURE 1 is an axial section through a preferred form of the valve, the section being taken on the plane indicated at 1—1 in FIGURE 4.

As will appear hereafter, the valve may take various detailed forms, but in the form shown it is adapted for reliable closure against high pressures, and comprises a housing 2 which may be of cast metal and which is provided with the inlet passage 4 and the outlet passage 6. The valve may control the flow of gaseous or liquid fluid which may contain solid material in suspension. By the adoption of suitable materials corrosive fluids may be handled. The housing is provided with a cylindrical bore 8 interrupted by the projection inwardly of a pair of lugs 10 and 12 acting as abutments as hereafter described. The cylindrical bore is closed at one end by the wall 14 and as its other end by a cover 16 secured by bolting with suitable packing. A large port 18 is continuously open and communicates with the inlet passage. 4. The outlet passage 6 is in communication with the bore 8 through the several open slots 20, 22 and 24 which may be of varying circumferential extents as indicated particularly in FIGURE 2 in order to produce more effective modulation of flow upon partial closure of the valve. In axial extent these slots may under some conditions be large; in other cases where very high pressures are involved they may be axially narrow but multiplied in number.

A shaft 26 extends through the cover 14 being suitably packed at the point of its passage through, and having a bearing in, the cover 16. The bearing and packing arrangements may be of various types and form no special part of the present invention, being adopted in accordance with the materials to be handled and the pressures involved. The projecting end 32 of the shaft is arranged to be operated by the motor 36 which may be of any type, as indicated above, capable of imparting reversible rotation to the shaft 26 through an adequate angular extent as will be evident hereafter.

Secured to the shaft 26 at 40 is a member 38 which, as clearly indicated in the figures, may take the form of a hollow metal body having a semi-cylindrical surface 42, this surface extending through approximately 180° and rounded at its ends to merge with a surface 43 approaching a diameter through the axis of the shaft 26 but bulging outwardly opposite the cylindrical surface 42. The two surfaces so merge at their curved ends that the resulting external shape of the member 38 is oval and smooth except for slots referred to later. The two ends of the member 38 are capped with plates 44 and 46, the latter of which may be integral with the member 38 while the former may be secured thereto by screws or otherwise. These plates need not close the open space within the member 38, and their primary function is to provide a pair of confining lips 48 and 50 extending slightly beyond the surfaces of the member 38. The projection of these lips is slight and the edges of the plates accordingly conform in contour substantially to the member 38.

A band 52 which is desirably continuous is provided with an outwardly extending portion 56 within which there extends an anchoring pin 54 in the end 14 of the housing and in the cover plate 16 to fix the band at 56 preventing its rotation within the housing. The band 52 has an axial extent corresponding to, but slightly less than, the axial spacing between the lips 48 and 50, which axial extent is greater than the outer limits of the assemblage of the slotted ports 20, 22 and 24. The band is arranged, as will appear, to cover these ports to provide closure. In the particular form which is being described this band may be considered as formed of thin stainless steel having spring-like characteristics. The circumference of the band as indicated in FIGURES 3, 4 and 5 is just slightly greater than the circumference of the member 38.

Another band 58 which may also be of stainless steel having spring characteristics also has an axial extent slightly less than the spacing between tha lips 48 and 50 and is adapted to be confined between them against axial movement. The ends of band 58 are secured in pins 60 and 64. The former of these pins is located in an axial slot 62 in the member 38 and in corresponding axial slots in the plates 44 and 46 and may extend slightly beyond these plates as indicated in FIGURE 2. The band 58 is thus anchored at one end to the member 38 though permitted to have angular freedom of movement at the pin 60. The pin 64 is located in a circumferentially extended slot 66 in the member 38 and corresponding slots in the plates 44 and 46. This pin thus has a freedom of cirmumferential movement as well as rotary movement. The ends of the pin 64 project axially to sufficient extents to engage the abutments 10 and 12.

To minimize friction during the operations about to be described it is desirable to face the inner surface of the band 52 with Teflon and the outer surface of the band 58 may also be faced with Teflon. To secure even more reliable closure by reason of the resilience of Teflon the material though it is not subjected to any substantial outer surface of the band 52 may also be faced with this sliding friction.

The operation of what has been structurally described may be considered in conjunction with the successive FIGURES 3, 4 and 5. When the parts are positioned as illustrated in FIGURE 3 the valve is in its full open position, and flow may occur from the inlet 4 through port 18 to the interior of the cylinder 8 and thence out through the ports 20, 22 and 24 to the outlet passage 6. At this time the spring band 58 will at least approximately conform to the position illustrated in FIGURE 3 in which it lies at least substantially in contact with the cylindrical surface 42 of the member 38 between the pins 60 and 64, the latter being substantially in the clockwise end of the slot 66. The spring band 58 may be initially shaped to achieve this position. The spring band 52 is shaped so as to tend to bulge outwardly, i.e., so that it would take generally circularly cylindrical form if freed from constraint. Because of its relationship to the contour of the member 38, i.e. slightly longer in length than this contour it will normally take a position as illustrated in FIGURE 3 in which opposite the surface 42 and the band 58 it will conform to the cylindrical surface of the bore 8, being then spaced from the band 58, and passing in contact with the ends of the member 38, bulging outwardly away from the surface 43.

As the shaft 26 and member 38 are then moved clockwise, the same general configurations of the bands will exist, but the band 52, prevented from rotation by the pin 54, and still bulging outwardly away from the cylindrical surface 42 and the band 58 will conform with the cylindrical surface of the bore 8 but now with portions thereon in the vicinity of the ports 20, 22 and 24, and as rotation continues, these ports are progressively closed off. Because of the Teflon lining in the interior of the band 52, the ends of the member 38 slide quite freely relatively to the band 52.

Increasing throttling of the flow occurs during the foregoing movement and finally, when the position of FIGURE 4 is reached, the band 52 will cover the outlet ports completely. But while this coverage will occur, the closure may not be completely tight although pressure at the inlet will serve to press the band 52 against the cylindrical wall. It may be noted that in the movement of the member 38 from the position of FIGURE 3 to that of FIGURE 4 the band 52 has no substantial sliding movement with respect to the bore of the housing. Rather, it merely rolls against it progressively along its length.

When movement takes place from the position shown in FIGURE 4 to that shown in FIGURE 5, a tightening action occurs which provides the desired tight closure of the valve. This results from the fact that as shown in FIGURE 4 the pin 64 abuts the stops 10 and 12 so that as further movement occurs the band 58, having considerable stiffness, is sprung outwardly by the continued movement of the pin 60 resting in the socket provided by the slot 62. In addition to the fluid pressure, the pressure of the band 58 forces the band 52 into tight engagement with the cylindrical wall between and about the inlet ports. Thus a tight closure is effected. In this final movement some relative sliding between the bands 58 and 52 takes place but the Teflon surface or surfaces as described minimize the friction.

In opening of the valve starting from the position shown in FIGURE 5, initial movement of the member 38 in a counterclockwise direction serves first to peel the band 58 away from the band 52, and to the extent that this peeling movement involves some little relative sliding, the Teflon surface or surfaces minimize friction. After the slight movement to the position of FIGURE 4, the band 58 is completely free of the band 52, and remains so during further movement. From the position of FIGURE 4 to that of FIGURE 3 the band 52 is, in effect, peeled from the cylindrical bore surface, and even though pressure may tend to maintain contact, the progressive peeling action removes the band 52 from contact in a fashion producing a minimum drag on the shaft 26. Any drag which exists of course rapidly drops as the slots are opened.

While the preferred construction and operation has been described, it will be evident that modifications may be provided which, in general, will involve simplification of the construction illustrated. It will be evident, for example, that the band 52 has a function which is largely that of preventing frictional movement during the closure action involving any sliding of a part along the seating surfaces about the slots 20, 22 and 24. If the arrangement is visualized as having the band 52 omitted, but with the band 58 present, it will be evident that as closing rotation proceeds there will be progressive throttling of flow by the member 38 and the band 58. In movement between positions corresponding to FIGURES 4 and 5, the band 58 will be sprung outwardly, upon arrest of pin 64, so that it would then close the outlet ports. If, instead of using a metallic spring band the band 58 was formed of a resilient sheet of Teflon or similar material the same action as last described would occur, with the progressive outward movement closing off the ports and with the final exertion of outward force producing a tight closure. For this purpose the Teflon sheet could have susbtantial thickness so as to resist extrusion into the ports which in this case would desirably have small axial extent or might be provided by a considerable number of small openings. In this arrangement the member 38 could well be reduced merely to an arm carrying the end of the Teflon sheet corresponding to the pin 60. In the opening of the valve a progressive peeling action would take place.

Figure 6:
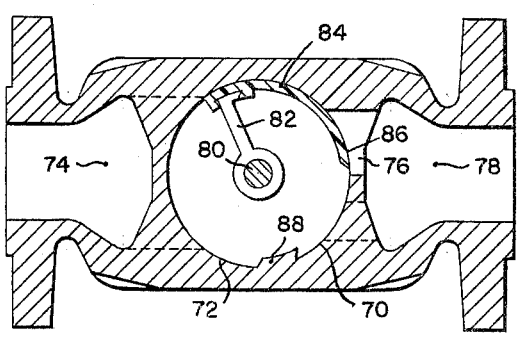
FIGURE 6 is a diagrammatic section showing a simpler modification.

A construction having the characteristics last mentioned is shown in FIGURE 6. This may be used in small valves particularly. The valve casing 70 is provided with the cylindrical opening 72 and has an inlet passage 74 and outlet slots 76 leading to the outflow passage 78, the construction being similar to that shown in FIGURES 1 to 5. The shaft 80, corresponding to shaft 26, may in this case carry only an arm 82 to which the end of a Teflon valve member 84 is secured. This valve member may be in the form of a heavy relatively stiff sheet of Teflon shaped to spring to a radius of curvature in excess of that of the bore 72. Its free end 86 is arranged to engage the stop 88. Because of its low friction characteristics, the member 84 will readily rotate within the cylindrical bore, and progressive close off of the slots 76 will take place during clockwise rotation. Finally, the end 86 of the valve member will be arrested by the stop 88 and the exertion of further torque will cause the valve member to flex outwardly to provide tight closure.

As will be evident from the foregoing, numerous variations may be made in applying the invention in practice, the variations, in particular, being chosen in accordance with pressure conditions which might be encountered. Accordingly, the invention is not to be considered as limited except as required by the following claims.

What is claimed is:

1. A valve comprising a housing having a bore provided with a cylindrical seating surface having at least one fluid outlet port, a conduit for inlet flow to said bore, a rotatable valve assembly in said bore, said assembly comprising a rotary support, and a valve element in the form of a stiff but flexible sheet extending normally at least approximately along said cylindrical surface, having one end associated with said support to rotate substantially therewith and having its other end free for movement relative to said support, and a stop engageable by the last mentioned end to be arrested thereby as the support rotates to effect outward flexure of the valve element towards said cylindrical surface to effect closure of the outlet port.

2. A valve according to claim 1 provided with a flexible sheet member interposed between said valve element and said cylindrical surface to be pressed tightly against said surface by the outward flexure of the valve element to close tightly said port.

3. A valve according to claim 1 provided with a nonrotatable flexible sheet member interposed between said valve element and said cylindrical surface to be pressed tightly against said surface by the outward flexure of the valve element to close tightly said port.

4. A valve according to claim 1 provided with a flexible sheet metal member interposed between said valve element and said cylindrical surface to be pressed tightly against said surface by the outward flexure of the valve element to close tightly said port.

5. A valve according to claim 1 provided with a nonrotatable flexible sheet metal member interposed between said valve element and said cylindrical surface to be pressed tightly against said surface by the outward flexure of the valve element to close tightly said port.

6. A valve according to claim 1 provided with a flexible sheet member interposed between said valve element and said cylindrical surface to be pressed tightly against said surface by the outward flexure of the valve element to close tightly said port, at least one of the engaging surfaces of the valve element and the flexible sheet member being coated with polytetrafluoroethylene.

7. A valve according to claim 2 in which said flexible sheet member forms a closed cylinder and in which the rotary support is oval in shape and within said closed cylinder to effect peeling of said closed cylinder from said cylindrical surface during valve-opening rotation of the rotary support.

8. A valve according to claim 2 in which said flexible sheet member which is nonrotatable and forms a closed cylinder and in which the rotary support is oval in shape and within said closed cylinder to effect peeling of said closed cylinder from cylindrical surface during valve-opening rotation of the rotary support.

9. A valve according to claim 1 in which said valve element directly engages said cylindrical surface to close said port.

10. A valve according to claim 1 in which said valve element is formed by a thick sheet of a plastic material directly engages said cylindrical surface to close said port.

References Cited by the Examiner
UNITED STATES PATENTS

| | | | |
|---|---|---|---|
| 417,702 | 12/1889 | Carroll et al. | 251—182 |
| 2,845,248 | 7/1958 | Fuglie | 251—192 X |
| 3,047,019 | 7/1962 | Simpson | 137—625.28 |

OTHER REFERENCES

Svenson: German application 1,054,799, printed April 9, 1959 (Kl. 47g27).

M. CARY NELSON, *Primary Examiner.*

A. ROSENTHAL, *Examiner.*